United States Patent
Kim et al.

(10) Patent No.: US 8,410,445 B2
(45) Date of Patent: Apr. 2, 2013

(54) HUMAN BODY SENSING APPARATUS WITH IMPROVED ACCURACY

(75) Inventors: Ji-yong Kim, Gyeonggi-do (KR); Yu-Chul Kim, Incheon (KR); Yong-Duck Lee, Gyeonggi-do (KR)

(73) Assignee: LINUDIX Co., Ltd. (KR)

(*) Notice: Subject to any disclaimer, the term of this patent is extended or adjusted under 35 U.S.C. 154(b) by 0 days.

(21) Appl. No.: 13/479,435

(22) Filed: May 24, 2012

(65) Prior Publication Data

US 2012/0248315 A1 Oct. 4, 2012

Related U.S. Application Data

(63) Continuation of application No. PCT/KR2011/007033, filed on Sep. 23, 2011.

(30) Foreign Application Priority Data

Mar. 30, 2011 (KR) .................. 10-2011-0028798

(51) Int. Cl.
*G01J 5/02* (2006.01)
*G01J 5/00* (2006.01)

(52) U.S. Cl. ........ 250/342; 250/349; 307/116; 307/117; 340/541

(58) Field of Classification Search .......... 250/349, 250/206, 221, 342; 356/51; 323/351; 307/117, 307/116; 340/540, 541, 573.1, 500; 348/169, 152; 315/159, 154, 307, 294; 700/275

See application file for complete search history.

(56) References Cited

U.S. PATENT DOCUMENTS

| 4,723,192 | A | * | 2/1988 | Lee | 361/175 |
|---|---|---|---|---|---|
| 5,726,633 | A | * | 3/1998 | Wiemeyer | 340/587 |
| 6,392,536 | B1 | * | 5/2002 | Tice et al. | 340/506 |
| 8,214,084 | B2 | * | 7/2012 | Ivey et al. | 700/275 |

FOREIGN PATENT DOCUMENTS

| KR | 20070013094 A | 1/2007 |
|---|---|---|
| KR | 20090113985 A | 11/2009 |

* cited by examiner

*Primary Examiner* — David Porta
*Assistant Examiner* — Yara Green
(74) *Attorney, Agent, or Firm* — Park & Associates IP Law, P.C.

(57) ABSTRACT

The present invention relates to a human body sensing apparatus with improved accuracy, in which whether a moving direction of a human body is a 'determinate entry or exit' or an 'indeterminate entry or exit' is determined by analyzing a sensing signal outputted from each of sensor units, and room occupancy states are classified into a 'ZERO' state, a 'CHECK' state, a 'WAIT' state, an 'AOL' state and an 'IOL' state depending on a determined result. Even a variety of unexpected behaviors that a human can perform in a sensing area of the sensor units can be detected, and thus correctness and correction rate are superior in calculating the number of people staying in a room.

4 Claims, 4 Drawing Sheets

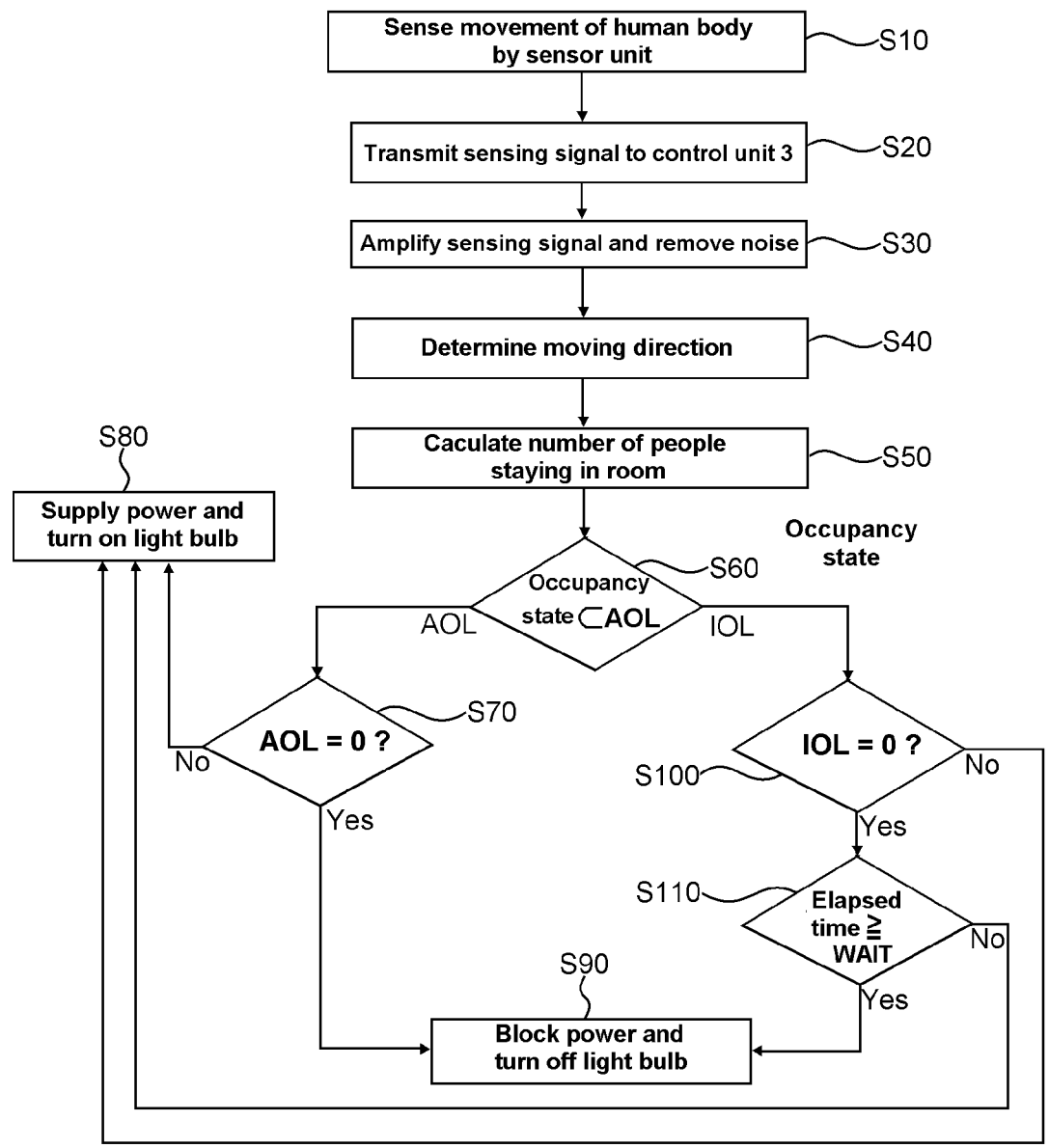

HUMAN BODY SENSING APPARATUS WITH IMPROVED ACCURACY

REFERENCE TO RELATED APPLICATIONS

This is a continuation of pending International Patent Application PCT/KR2011/007033 filed on Sep. 23, 2011, which designates the United States and claims priority of Korean Patent Application No. 10-2011-0028798 filed on Mar. 30, 2011, the entire contents of which are incorporated herein by reference.

FIELD OF THE INVENTION

The present invention relates to a human body sensing apparatus with improved accuracy, in which the number of human bodies waiting in a predetermined area is correctly counted using sensors, and light bulbs are turned on and off depending on the number of people staying in a room.

BACKGROUND OF THE INVENTION

A human body detecting sensor is a sensor for determining existence of a human body in a predetermined area, and an infrared sensor for determining existence of a human body by sensing infrared rays generated by the human body or a radar sensor using reflection of microwaves is generally used as the human body detecting sensor. At this point, the infrared sensor determines existence of a human body using minute infrared rays radiated from the human body based on the fact that far infrared rays having a peak of about 9 to 10 μm are radiated from the body of a person having a body temperature of approximately 36 to 37° C., and the radar sensor detects movement of an object by comparing transmission and reflection waveforms of microwaves having an approximately 2.4 to 24 GHz bandwidth.

Furthermore, as the age of automation has come, human body sensing apparatuses automatically performing a specific function based on a result of sensing a human body or occupancy of a room are used in variety of fields such as human body sense lighting, air purifiers, intrusion alert security apparatuses and the like, and unmanned human body sensing apparatuses performing a specific function based on occupancy of a room are used in further wider areas owing to convenience and advantages in that consumption of manpower and electric power is reduced.

FIG. 1 is a view describing the problems of a conventional human body sensing apparatus.

As shown in FIG. 1, the conventional human body sensing apparatus 100 includes a sensor 101 mainly installed on a door and performing one-dimensional sensing operations, and a control unit (not shown) for calculating occupancy of a room using sensing signals sensed by the sensor 101.

In addition, the conventional human body sensing apparatus 100 is generally installed on a door 104 to correspond to the waist of a human body, and since manufacturing cost thereof is low, the human body sensing apparatus 100 are generally used on the doors 104 of toilets or offices.

However, since the sensor 101 is capable of performing only one-dimensional sensing operations, if a pedestrian 105 changes a walking route in a sensing area of the sensor 101 as shown in FIG. 1(a), the conventional human body sensing apparatus 100 does not correctly recognize the change of the route, and an error occurs.

Furthermore, if a pedestrian 105 irregularly moves in a sensing area of the sensor 101 as shown in FIG. 1(b), the conventional human body sensing apparatus 100 may not flexibly respond to the unexpected behavior of the human body, and thus accuracy in calculating occupancy of a room is lowered.

Furthermore, if a pedestrian 105 moves in and out of a room through the door 104 holding a big baggage 107 as shown in FIG. 1(c), the conventional human body sensing apparatus 100 calculates occupancy of a room determining even the baggage 107 as a human body, in addition to the pedestrian 105.

As described above, the conventional human body sensing apparatus 100 cannot flexibly respond to various unexpected behaviors that a human body may perform, and thus reliability of a value calculated as occupancy of a room is extremely lowered. Such an inaccurate detection rate for the occupancy of a room may abruptly turn off light bulbs although there are people waiting in the room, and thus human bodies of the people waiting in the room are momentarily endangered, and it can lead to a fatal accident claiming human's life.

Furthermore, since the detection rate for the occupancy of a room is lowered, the conventional human body sensing apparatus 100 does not correctly grasp the occupancy of a room even when there is no one waiting in the room. Therefore, it is frequent that the light bulbs are continuously turned on, and thus a reverse effect of further increasing power consumption occurs.

SUMMARY OF THE INVENTION

Therefore, the present invention has been made in view of the above problems, and it is an object of the present invention to provide a human body sensing apparatus with improved accuracy, in which a plurality of analysis modules respectively having a different algorithm analyzes sensing signals detected by a plurality of sensor units which senses a predetermined area two-dimensionally, and a moving direction of a human body is determined based on the analysis. The moving direction of the human body is determined as a 'determinate entry or exit' or an 'indeterminate entry or exit' depending on the determined moving direction, and the number of people staying in the room is calculated by classifying current room occupancy states into a 'ZERO' state, a 'CHECK' state, a 'WAIT' state, an 'AOL' state and an 'IOL' state depending on the determined moving direction. Therefore, light bulbs are turned on and off by correctly sensing entry and exit of the human body considering diverse behaviors performed by the human body.

To achieve the above object, the present invention provides the human body sensing apparatus for detecting the number of people staying in an indoor space by sensing a human body moving in and out of the indoor space including the plurality of sensor, the movement state determination module, and the count and correction module.

The plurality of sensor units for sensing the human body in areas sequentially set from an entrance toward inside of the indoor space;

The movement state determination module including a plurality of analysis means for receiving sensing signals outputted from the plurality of sensor units and detecting whether a moving direction of the human body is an 'entry' direction from the entrance into the indoor space or an 'exit' direction, outputting a 'determinate entry' signal if all the moving directions detected by the plurality of analysis means for a predetermined check time are the 'entry' direction, and outputting a 'determinate exit' signal if all the moving directions detected by the plurality of analysis means are the 'exit' direction; and The count and correction module for increasing the number of people staying in the room by '1' whenever the 'determinate entry' signal is inputted from the movement state determination module, and decreasing the number of people staying in the room by '1' whenever the 'determinate exit' signal is inputted.

The movement state determination module outputs an 'indeterminate entry' signal if the 'entry' or 'exit' directions detected by the plurality of analysis modules for the check time do not correspond and the number of the 'entry' directions detected by the plurality of analysis modules is larger and outputs an 'indeterminate exit' signal if the number of the 'exit' directions is larger, and the count and correction module calculates an 'indeterminate number of people staying in the room' by adding '1' to the number of people staying in the room if the 'indeterminate entry' signal is received and subtracting from the number of people staying in the room if the 'indeterminate exit' signal is received, corrects the 'indeterminate number of people staying in the room' by decreasing the 'indeterminate number of people staying in the room' by at every predetermined IDLE time while the sensing signal is not generated, and if the sensing signal is generated, decreasing the 'indeterminate number of people staying in the room' based on detection of the 'determinate exit' signal and the 'indeterminate exit' signal, and increasing the 'indeterminate number of people staying in the room' based on detection of the 'determinate entry' signal and the 'indeterminate entry' signal.

The power supply and block unit for supplying or blocking power to or from the indoor space, wherein the count and correction module transmits a power block signal to the power supply and block unit if the number of people staying in the room becomes '0'.

The power supply and block unit for supplying or blocking power to or from the indoor space, wherein the count and correction module transmits a control signal to the power supply and block unit and blocks the power if the sensing signal is not generated for a predetermined WAIT time after the 'indeterminate number of people staying in the room' becomes '0'.

According to the present invention so constructed, the human body sensing apparatus comprises a movement state determination module including a plurality of analysis modules respectively having a different algorithm. The plurality of analysis modules analyzes sensing signals sensed by sensor units using a different algorithm respectively, and the movement state determination module determines a moving direction as 'determinate entry', 'determinate exit', 'indeterminate entry', or 'indeterminate exit' depending on whether or not the moving directions determined by the analysis modules correspond, and thus the number of people staying in a room is correctly calculated.

In addition, the count and correction module of the human body sensing apparatus classifies current room occupancy states into a 'ZERO' state, a 'CHECK' state, a 'WAIT' state, an 'AOL' state and an 'IOL' state depending on the moving direction of the human body received from the movement state determination module, thereby differently calculating the number of people staying in a room based on 'determinate entry and exit' and 'indeterminate entry and exit'.

In addition, in the case where the current room occupancy state is 'indeterminate entry and exit' and occupancy of a room is '0', the count and correction module subtract '1' from the number of people currently staying in the room if any movement is not sensed by the sensor unit until a predetermined IDLE time is elapsed. If such an operation is repeated and the indeterminate current number of people staying in the room becomes '0', the room occupancy state transits to the 'WAIT' state, and thus an error that may occur due to the 'indeterminate entry and exit' may be corrected.

In addition, the count and correction module measures an elapsed time in the 'WAIT' state, and if any movement is not sensed by the sensor unit until the elapsed time reaches a predetermined WAIT time, the count and correction module determines to turn off the light bulb, and thus an error that may occur due to the 'indeterminate entry and exit' may be corrected.

BRIEF DESCRIPTION OF THE DRAWINGS

FIG. 6 is a flowchart illustrating the operating process of a human body sensing apparatus according to an embodiment of the present invention.

DETAILED DESCRIPTION OF THE INVENTION

An embodiment of the present invention will be hereafter described with reference to the accompanying drawings.

Figure 1:
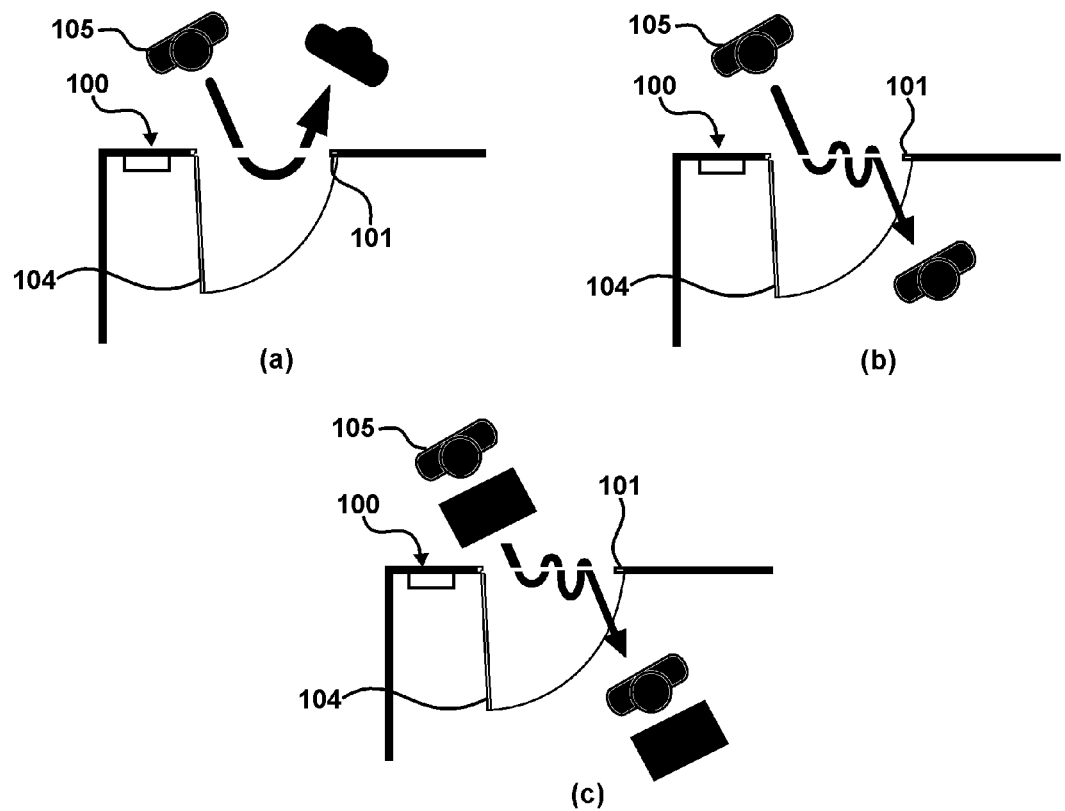
FIG. 1 is a view describing the problems of a conventional human body sensing apparatus.
Figure 2:
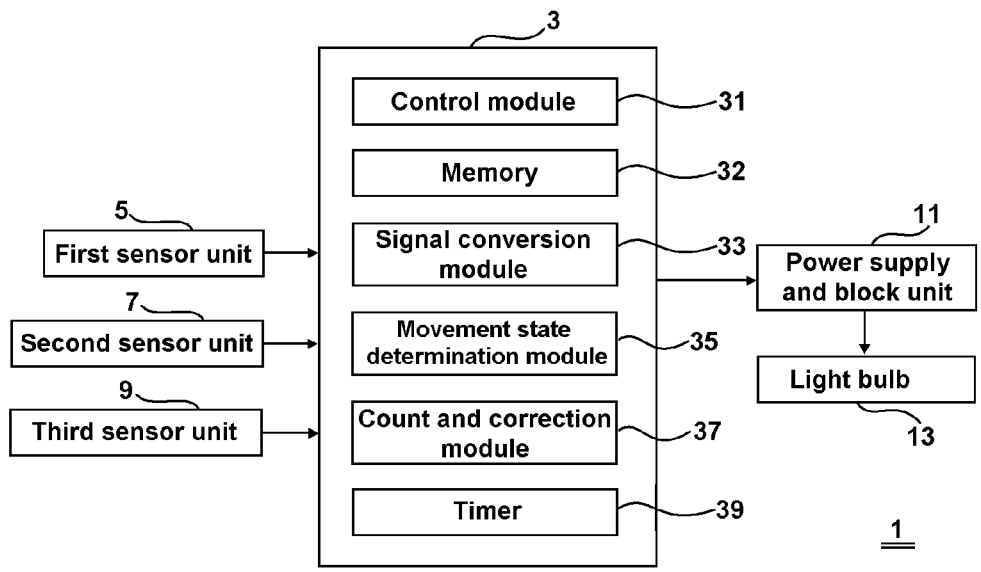
FIG. 2 is a block diagram showing a human body sensing apparatus according to an embodiment of the present invention.

FIG. 2 is a block diagram showing a human body sensing apparatus according to an embodiment of the present invention.

The control unit 3 of the human body sensing apparatus 1 shown in FIG. 2 includes a control module 31, memory 32, a signal conversion module 33, a movement state determination module 35, a count and correction module 37, and a timer 39. The control unit 3 connects a first sensor unit 5 for sensing an area adjacent to a door (not shown) of an indoor space, a second sensor unit 7 for sensing the inside of a sensing area sensed by the first sensor unit 5, a third sensor unit 9 for sensing the inside of a sensing area sensed by the second sensor unit 7, and a power supply and block unit 11 for controlling turn-on and turn-off of a light bulb 13 by supplying or blocking power, and the control unit 3 controls the connection targets 5, 7, 9 and 11.

At this point, the first sensor unit 5, the second sensor unit 7 and the third sensor unit 9 may be configured with sensors of various configurations capable of sensing a human body in predetermined sensing areas and is preferably configured with infrared sensors which detect a human body by sensing infrared rays radiated from the human body.

Figure 3:
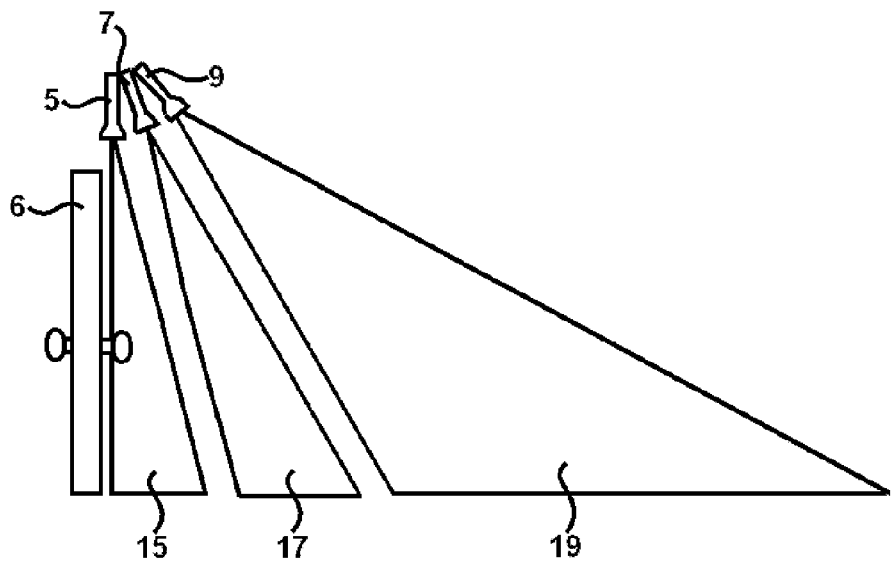
FIG. 3 is an exemplary view showing sensing areas of sensor units of a human body sensing apparatus according to an embodiment of the present invention.

FIG. 3 is an exemplary view showing sensing areas of sensor units of a human body sensing apparatus according to an embodiment of the present invention.

As shown in FIG. 3, the first sensor unit 5, the second sensor unit 7 and the third sensor unit 9 of the human body sensing apparatus 1 according to an embodiment of the present invention sense entry and exit of a human body in the areas sequentially set from a door 6 toward the inside of an indoor space. At this point, the first sensor unit 5 senses movement of the human body in a first sensing area 15 formed in an area adjacent to the door 6, and the second sensor unit 7 senses movement of the human body in a second sensing area 17 subsequently formed toward the inside of the first sensing area 15. The third sensor unit 9 senses movement of the human body in a third sensing area 19 subsequently formed toward the inside of the second sensing area 17.

In addition, if the first sensor unit 5, the second sensor unit 7 and the third sensor unit 9 sense entry and exit of a human body in the corresponding sensing areas 15, 17 and 19, they output and transmit a sensing data to the control unit 3.

In addition, although it is described as an example in FIG. 3 that three sensor units 5, 7 and 9 are configured, the number of sensor units is not limited thereto, and it is preferable to configure at least three or more sensor units in order to correctly determine a state of movement of a human body.

In addition, if the first sensor unit 5, the second sensor unit 7 and the third sensor unit 9 sense infrared rays generated from the human body in each of the sensing areas 15, 17 and 19, they transmit a sensing data to the control unit 3.

The power supply and block unit 11 is connected the light bulb 13 which emits light in a predetermined area, and if the power supply and block unit 11 receives a power block control signal from the control unit 3, it turns off the light bulb 13 by blocking power.

The control module 31 is an operating system (OS) of the control unit 3 and controls each of the constitutional modules 32, 33, 35, 37 and 39.

In addition, if the control module 31 receives a sensing signal from each of the first sensor unit 5, the second sensor unit 7 and the third sensor unit 9, it transmits the received sensing signal to the signal conversion module 33.

In addition, if the count and correction module 37 detects the current number of people staying in a room as '0', the control module 31 transmits the power block control signal to the power supply and block unit 11 so that the light bulb 13 is turned off.

The memory 32 stores the predetermined sensing areas 15, 17 and 19 of the sensor units 5, 7 and 9 and the current number of people staying in the room received from the count and correction module 37.

The signal conversion module 33 amplifies and converts a weak sensing signal received from each of the first sensor unit 5, the second sensor unit 7 and the third sensor unit 9 into a recognizable signal under the control of the control module 31.

That is, the signal conversion module 33 is configured as a conventionally used electrical circuit, and describing in detail, the signal conversion module 33 includes an amplifier for amplifying a weak sensing signal received from each of the sensing units 5, 7 and 9 and filters for removing noises of the signal outputted through the amplifier. At this point, the converted data (signal) is transmitted to the movement state determination module 35 under the control of the control module 31.

Figure 4:
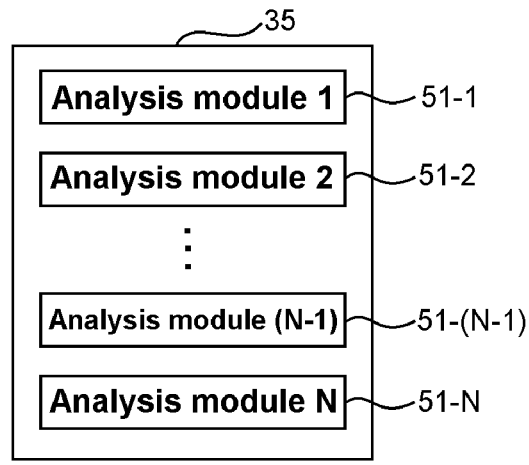
FIG. 4 is a block diagram showing a movement state determination module of FIG. 2.

FIG. 4 is a block diagram showing a movement state determination module of FIG. 2.

The movement state determination module 35 of FIG. 4 analyzes the signal received from the signal conversion module 33, i.e., the sensing signal outputted from each of the sensor units 5, 7 and 9, and determines an entry or exit direction of the human body.

In addition, the movement state determination module 35 includes a plurality of analysis modules 51-1, 51-2, . . . , 51-(N−1) and 51-N. Each of the analysis modules 51-1, . . . , 51-N analyzes a sensing signal outputted from each of the sensor units 5, 7 and 9 and determines an entry or exit direction of the human body. The analysis modules are configured to respectively analyze the sensing signal in a different method, and thus if a signal is inputted, each of the analysis modules 51-1, . . . , 51-N analyzes the signal according to an algorithm configured in each of the analysis modules and determines an entry or exit direction of the human body. At this point, since the method of detecting a moving direction of a human body using a sensing data is a generally used technique, details thereof will not be described.

In addition, since the analysis modules 51-1, . . . , 51-N determine the entry or exit direction of a human body using a different algorithm, they can analyze a variety of unexpected behaviors that a human can perform in the sensing areas 15, 17 and 19.

In addition, since each of the analysis modules 51-1, . . . , 51-N of the movement state determination module 35 outputs a moving direction data of a human body using a different algorithm for a signal received from the signal conversion module 33, accuracy of detection increases.

In addition, if the movement state determination module 35 receives the sensing signal from the signal conversion module 33, the analysis modules 51-1, . . . , 51-N respectively determine a moving direction of the human body based on the algorithm configured in each of the analysis modules. At this point, if all the analysis modules 51-1, . . . , 51-N determine the moving direction of the human body as 'entry of human body', which is defined as a direction moving from outside to inside of the door 6, the movement state determination module 35 determines the moving direction as 'determinate entry'. If all the analysis modules 51-1, . . . , 51-N determine the moving direction of the human body as 'exit of human body', the movement state determination module 35 determines the moving direction as 'determinate exit'.

In addition, if the moving direction data of the human body determined by the analysis modules 51-1, . . . , 51-N do not correspond, the movement state determination module 35 determines the moving direction of the human body as 'indeterminate entry' or 'indeterminate exit' following the majority of the determination. For example, if analysis modules 51-1 and 51-3 determine the moving direction of the human body as 'exit of human body' and the other analysis modules 51-2, 51-4, . . . , 51-N determine the moving direction of the human body as 'entry of human body', the movement state determination module 35 determines the moving direction of the human body as 'indeterminate entry' since the moving directions determined by the analysis modules 51-1, . . . , 51-N do not correspond, but a majority of the analysis modules 51-2, 51-4, . . . , 51-N determines the moving direction of the human body as 'entry of human body'.

In addition, the movement state determination module 35 transmits the determined movement state data to the count and correction module 37 under the control of the control module 31.

Figure 5:
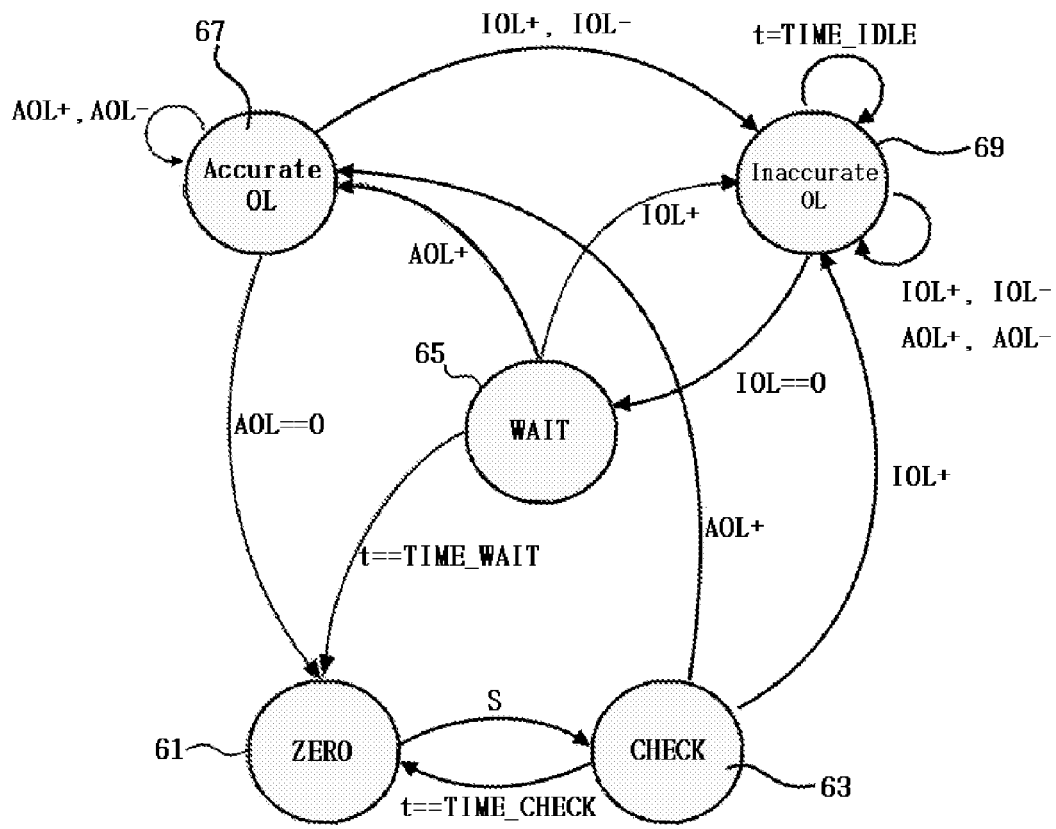
FIG. 5 shows a state transition diagram of the count and correction module of FIG. 2.

FIG. 5 shows a state transition diagram of the count and correction module of FIG. 2.

If the count and correction module 37 receives moving direction data from the movement state determination module 35, it counts the current number of people staying in a room. If the current number of people staying in the room is '0', the count and correction module 37 transmits a turn-off data to the control module 31, and if the current number of people staying in the room is calculated to be larger than '0', the count and correction module 37 transmits a turn-on data to the control module 31. At this point, as the control module 31 controls the power supply and block unit 11 depending on the turn-on or turn-off data, and thus turn-on or turn-off of the light bulb 13 is flexibly accomplished.

In addition, the count and correction module 37 calculates the number of people staying in the room correctly without an error for all the diverse unexpected behaviors that a human can perform within the sensing areas 15, 17 and 19, in addition to calculating the number of people staying in the room using the moving direction data, such as 'determinate entry', 'determinate exit', 'indeterminate entry' and 'indeterminate exit' data, received from the movement state determination module 35.

In addition, for the convenience of explanation in the count and correction module 37, 'determinate entry' is referred to as Accurate Occupation in (AOL+), 'determinate exit' is referred to as Accurate Occupation out (AOL−), 'indeterminate entry' is referred to as Inaccurate Occupation in (IOL+), 'indeterminate exit' is referred to as Inaccurate Occupation out (IOL−), the determinate current number of people staying in a room is referred to as Accurate Occupation Level (AOL), and the indeterminate current number of people staying in a room is referred to as Inaccurate Occupation Level (IOL).

In addition, as shown in FIG. 5, the count and correction module 37 classifies room occupancy states into five states depending on the movement state data received from received from the movement state determination module 35 and classifies the number of people staying in a room into the determinate number of people staying in a room and the indeterminate number of people staying in a room depending on the received movement state data. At this point, the five states include a 'ZERO' state 61, a 'CHECK' state 63, a 'WAIT' state 65, an 'AOL' state 67 and an 'IOL' state 69.

That is, the count and correction module 37 adds or subtracts '1' to or from the AOL (the determinate number of people staying in a room) if AOL+ or AOL− data is received from the movement state determination module 35, and adds or subtracts '1' to or from the IOL (the indeterminate number of people staying in a room) if IOL+ or IOL− data is received from the movement state determination module 35, thereby calculating the number of people staying in a room (AOL and IOL) depending on whether the moving direction determined by the movement state determination module 35 is 'determinate entry and exit' or 'indeterminate entry and exit'.

The 'ZERO' state 61 determines that the current number of people staying in a room is '0' and outputs a turn-off data, which corresponds to a case where the determinate number of people staying in a room (AOL) is '0'.

In addition, if a sensing data is outputted from any one of the sensor units 5, 7 and 9, the 'ZERO' state 61 moves to the 'CHECK' state 63.

In addition, as soon as the 'ZERO' state 61 moves to the 'CHECK' state 63, the count and correction module 37 operates the timer 39.

If the sensor units 5, 7 and 9 do not output any sensing data until a time measured by the timer 39 reaches a predetermined CHECK time, the 'CHECK' state 63 moves back to the 'ZERO' state 61.

In addition, the 'CHECK' state 63 moves to the 'AOL' state 67 if 'AOL+' or 'AOL−' data is received from the movement state determination module 35 before the time measured by the timer 39 reaches the predetermined CHECK time, and the 'CHECK' state 63 moves to the 'IOL' state 69 if 'IOL+' or 'IOL−' data is received from the movement state determination module 35.

For example, if a human body moves into the first sensing area 15, the count and correction module 37 senses movement of the human body in the 'ZERO' state 61 and measures an elapsed time after transiting the room occupancy state into the 'CHECK' state 63. If the human body temporarily moves into the first sensing area 15 and moves out of the door 6, the count and correction module 37 transits the room occupancy state to the 'CHECK' state 63 and then to the 'ZERO' state 61 again since the sensor units 5, 7 and 9 do not sense any movement of the human body until the elapsed time reaches the CHECK time. If the human body moves inside the door 6 and thus the second sensor unit 7 or the third sensor unit 9 outputs a sensing data, the count and correction module 37 transits the room occupancy state to a next state (the 'AOL' state 67 or the 'IOL' state 69), thereby correctly sensing unexpected behaviors of the human body.

The 'AOL' state 67 is a state moved into when the moving direction of a human body is determined as 'determinate entry' or 'determinate exit' by the movement state determination module 35 which receives sensing signals outputted from the sensor units 5, 7 and 9 when the human body is sensed in the sensing areas 15, 17 and 19, and '1' is added or subtracted to or from the AOL if 'AOL+' or 'AOL−' data is received from the movement state determination module 35.

In addition, if 'IOL+' or 'IOL−' data is received from the movement state determination module 35 in the 'AOL' state 67, the room occupancy state transits to the 'IOL' state 69 after '1' is added or subtracted to or from the AOL, and a value calculated by adding or subtracting '1' to or from AOL substitutes for the IOL value.

In addition, since the 'AOL' state 67 is calculated depending on actual entry and exit if AOL becomes 0, the 'AOL' state 67 immediately moves to the 'ZERO' state 61 without need of a separate corrective work, and the light bulb 13 is turned off.

The 'IOL' state 69 is a state moved into when the moving direction of a human body is determined as 'indeterminate entry' or 'indeterminate exit' by the movement state determination module 35 which receives sensing signals outputted from the sensor units 5, 7 and 9 when the human body is sensed in the sensing areas 15, 17 and 19, and the timer 39 starts to operate and measures an elapsed time t as soon as the room occupancy state moves into the 'IOL' state 69.

In addition, if the room occupancy state transits to the 'IOL' state 69, the count and correction module 37 operates the timer 39 and measures an elapsed time t. If the sensor units 5, 7 and 9 do not sense any sensing signal until the elapsed time t reaches a correction time (hereinafter, referred to as an IDLE time) defined by mathematical expression 1 shown below, '1' is subtracted from 'IOL'. This operation is repeated at every IDLE time, and if the IOL value becomes '0', the room occupancy state transits from the 'IOL' state 69 to the 'WAIT' state 65.

$$\text{IDLE time} = \frac{C}{IOL} \times IDLEMUL \qquad \text{Mathematical expression 1}$$

At this point, C denotes a constant, IOL denotes the indeterminate number of people staying in a room, and an IDLEMUL value is a value calculated in the 'WAIT' state 65.

As described above, the room occupancy state transits to the 'IOL' state 69 if all the analysis modules 51-1, . . . , 51-N of the movement state determination module 35 do not produce the same result for the moving direction of the sensed human body. Therefore, if a movement is not sensed until the elapsed time t passes the IDLE time, the count and correction module 37 subtracts the IOL value by '1', and thus an error occurred in calculating the number of people staying in a room due to diverse unexpected behaviors of the human body may be corrected.

In addition, the 'IOL' state 69 adds '1' to IOL if 'AOL+' or 'IOL+' data is received from the movement state determination module 35, subtracts '1' from IOL if 'AOL−' or 'IOL−' data is received from the movement state determination module 35, and transits to the 'WAIT' state 65 if the IOL value becomes '0'.

That is, the 'IOL' state 69 subtracts '1' from IOL if a sensing data is not outputted until the elapsed time reaches the IDL time. If the subtraction is repeated until the IOL value becomes '0', the room occupancy state transits to the 'WAIT' state 65, and thus an error that may occur due to an indeterminate entry (IOL+) or exit (IOL−) may be corrected in the 'WAIT' state 65.

The 'WAIT' state is a state moved into when the indeterminate current number of people staying in a room IOL is '0', which is a state for correcting inaccurate data that may occur due to an 'indeterminate entry' IOL+ or an 'indeterminate exit' IOL−.

In addition, the 'WAIT' state 65 operates the timer 39 and measures an elapsed time t', and moves to the 'ZERO' state 61 if any sensing data is not outputted from the sensor units 5, 7 and 9 until the measured elapsed time t' reaches a predetermined WAIT time.

In addition, if 'AOL+' or 'AOL−' data is received from the movement state determination module 35 before the measured elapsed time reaches the WAIT time, the 'WAIT' state 65 moves to the 'AOL' state 67, and the steps after the 'AOL' state 67 are performed again. At this point, if determinate exit (AOL−) or indeterminate exit (IOL−) data is received in the 'WAIT' state 65, the indeterminate current number of people staying in a room is not '0', and thus it is preferable to change the IDLE time to be large by setting the IDLEMUL value applied to mathematical expression 1 to be larger than the predetermined value.

In addition, if 'IOL+' or 'IOL−' data is received from the movement state determination module 35 before the elapsed time reaches the WAIT time in the 'WAIT' state 65, the 'WAIT' state 65 moves to the 'IOL' state 69, and the steps after the 'IOL' state 69 are performed again.

FIG. 6 is a flowchart illustrating the operating process of a human body sensing apparatus according to an embodiment of the present invention.

If a human body moves in or out of the predetermined sensing areas 15, 17 and 19, the sensor units 5, 7 and 9 sense movement of the human body (S10). The sensor units 5, 7 and 9 transmit a sensing signal to the control unit 3 (S20).

The signal conversion module 33 of the control unit 3 amplifies and converts the sensing signal received from the sensor units 5, 7 and 9 into a recognizable signal and removes noises of the sensing signal using a filter (not shown). At this point, the amplified signal is transmitted to the movement state determination module 35 (S30).

If the movement state determination module 35 receives the sensing signal from the signal conversion module 33, the analysis modules 51-1, . . . , 51-N respectively having a different algorithm analyze the received sensing signal and determine whether movement of the human body is an entry or an exit. At this point, the movement state determination module 35 determines the moving direction of the human body as 'determinate entry' or 'determinate exit' if moving directions of the human body determined by the respective analysis modules 51-1, . . . , 51-N correspond and determines the moving direction of the human body as 'indeterminate entry' or 'indeterminate exit' following the majority of the determination if moving directions of the human body do not correspond (S40).

The count and correction module 37 classifies room occupancy states into a 'ZERO' state 61, a 'CHECK' state 63, a 'WAIT' state 65, an 'AOL' state 67 and an 'IOL' state 69 depending on the moving direction data received from the movement state determination module 35, and each of the states 61, 63, 65, 67 and 69 is driven as described above and calculates AOL and IOL values (S50).

The count and correction module 37 determines whether the current room occupancy state is the 'AOL' state 67 or the 'IOL' state 69 (S60).

If the current room occupancy state is the 'AOL' state 67, the count and correction module 37 determines whether or not the AOL value is '0' (S70). If the AOL value is not '0', the count and correction module 37 transmits a power supply control signal to the power supply and block unit 11 under the control of the control unit 31. If the power supply control signal is received, the power supply and block unit 11 supplies power to the light bulb 13, and the light bulb is turned on. Then, the count and correction module 37 returns to step S10, and the steps after step S10 are performed again (S80). If the AOL value is '0', a power block control signal is transmitted to the power supply and block unit 11, and the light bulb 13 is turned off (S90).

If the current room occupancy state is the 'IOL' state 69, the count and correction module 37 determines whether or not the IOL value is '0' (S70). If the IOL value is not '0', the count and correction module 37 returns to step S80, and the steps after step S80 are performed again (S100).

If the IOL value is '0', the count and correction module 37 determines whether an elapsed time t' during which a sensing signal is not detected by the sensor units 5, 7 and 9 is larger than the WAIT time. At this point, if the elapsed time t' is smaller than the WAIT time, the light bulb continues to be turned on (S80), and if the elapsed time t' exceeds the WAIT time, power is blocked, and the light bulb is turned off (S90).

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A human body sensing apparatus for detecting the number of people staying in an indoor space by sensing a human body moving in and out of the indoor space, the apparatus comprising:

a plurality of sensor units for sensing the human body in areas sequentially set from an entrance toward inside of the indoor space;

a movement state determination module including a plurality of analysis means for receiving sensing signals outputted from the plurality of sensor units and detecting whether a moving direction of the human body is an 'entry' direction from the entrance into the indoor space or an 'exit' direction, outputting a 'determinate entry' signal if all the moving directions detected by the plurality of analysis means are the 'entry' direction, and outputting a 'determinate exit' signal if all the moving directions detected by the plurality of analysis means are the 'exit' direction; and a count and correction module for increasing the number of people staying in the room by '1' whenever the 'determinate entry' signal is inputted from the movement state determination module, and decreasing the number of people staying in the room by '1' whenever the 'determinate exit' signal is inputted, wherein the movement state determination module outputs an 'indeterminate entry' signal if the 'entry' or 'exit' directions detected by the plurality of analysis modules for the check time do not correspond and the number of the 'entry' directions detected by the plurality of analysis modules is larger than the number of the 'exit' directions, and outputs an 'indeterminate exit' signal if the number of the 'exit' directions is larger than the number of the 'entry' directions, and wherein the count and correction module calculates an 'indeterminate number of people staying in the room' by adding '1' to the number of people staying in the room if the 'indeterminate entry' signal is received and subtracting '1' from the number of people staying in the room if the 'indeterminate exit' signal is received, corrects the 'indeterminate number of people staying in the room' by decreasing the 'indeterminate number of people staying in the room' by '1' at every predetermined IDLE time while the sensing signal is not generated, and if the sensing signal is generated, decreasing the 'indeterminate number of people staying in the room' by '1' based on detection of the 'determinate exit' signal and the 'indeterminate exit' signal, and increasing the 'indeterminate number of people staying in the room' by '1' based on detection of the 'determinate entry' signal and the 'indeterminate entry' signal.

2. The apparatus according to claim 1, further comprising a power supply and block unit for supplying or blocking power to or from the indoor space, wherein the count and correction module transmits a power block signal to the power supply and block unit if the number of people staying in the room becomes '0'.

3. The apparatus according to claim 1, further comprising a power supply and block unit for supplying or blocking power to or from the indoor space, wherein the count and correction module transmits a control signal to the power supply and block unit and blocks the power if the sensing signal is not generated for a predetermined WAIT time after the 'indeterminate number of people staying in the room' becomes '0'.

4. The apparatus according to claim 1, wherein the plurality of sensor units for sensing the human body include at least three infrared sensors installed above an entrance door.

\* \* \* \* \*